(12) United States Patent
Häfner et al.

(10) Patent No.: US 10,569,216 B2
(45) Date of Patent: Feb. 25, 2020

(54) DEVICE AND METHOD FOR SEPARATING CARBON DIOXIDE FROM A GAS STREAM, IN PARTICULAR FROM A FLUE GAS STREAM, COMPRISING A COOLING WATER SYSTEM

(71) Applicant: Siemens Aktiengesellschaft, Munich (DE)

(72) Inventors: Benjamin Häfner, Langenselbold (DE); Albert Reichl, Bad Soden (DE); Tim Rogalinski, Kelkheim (DE); Henning Schramm, Hofheim am Taunus (DE); Jörg Weber, Egelsbach (DE)

(73) Assignee: Siemens Aktiengesellschaft, Munich (DE)

( * ) Notice: Subject to any disclaimer, the term of this patent is extended or adjusted under 35 U.S.C. 154(b) by 442 days.

(21) Appl. No.: 15/129,503

(22) PCT Filed: Mar. 24, 2015

(86) PCT No.: PCT/EP2015/056239
§ 371 (c)(1),
(2) Date: Sep. 27, 2016

(87) PCT Pub. No.: WO2015/154988
PCT Pub. Date: Oct. 15, 2015

(65) Prior Publication Data
US 2017/0120186 A1 May 4, 2017

(30) Foreign Application Priority Data
Apr. 7, 2014 (DE) .......................... 10 2014 206 630

(51) Int. Cl.
*B60K 35/00* (2006.01)
*B60K 37/02* (2006.01)
(Continued)

(52) U.S. Cl.
CPC ......... *B01D 53/18* (2013.01); *B01D 53/1425* (2013.01); *B01D 53/1475* (2013.01);
(Continued)

(58) Field of Classification Search
CPC ...... B01D 2257/504; B01D 2258/0283; B01D 2259/65; B01D 53/1425; B01D 53/1475;
(Continued)

(56) References Cited

U.S. PATENT DOCUMENTS 6,488,742 B1 * 12/2002 Grunewald ........ B01D 53/1425
95/173
2005/0169825 A1 8/2005 Cadours et al.
(Continued)

FOREIGN PATENT DOCUMENTS

CN 102559278 A 7/2012
EP 1552874 A1 7/2005
(Continued)

OTHER PUBLICATIONS

DE Search Report dated Dec. 17, 2014, for DE application No. 102014206630.1.
(Continued)

*Primary Examiner* — Cabrena Holecek
(74) *Attorney, Agent, or Firm* — Beusse Wolter Sanks & Maire

(57) ABSTRACT

A device for separating carbon dioxide from a gas stream, in particular from a flue gas stream, includes an absorber for separating the carbon dioxide from the gas stream by means of a washing medium, a desorber which is fluidically connected to the absorber to release the absorbed carbon dioxide from the washing medium, a gas cooler which is fluidically connected upstream of the absorber to cool the gas stream, and a processing unit which is connected downstream of the gas cooler and which is equipped and designed to clean
(Continued)

water from the gas cooler. A method separates carbon dioxide from a gas stream.

19 Claims, 1 Drawing Sheet

(51) Int. Cl.
    *F16H 19/04*     (2006.01)
    *F16H 25/20*     (2006.01)
    *B01D 53/18*     (2006.01)
    *B01D 53/14*     (2006.01)
    *F23J 15/04*     (2006.01)
    *B01D 61/02*     (2006.01)
    *C02F 1/44*     (2006.01)
    *C02F 103/18*     (2006.01)

(52) U.S. Cl.
CPC ............ *B01D 61/025* (2013.01); *C02F 1/441* (2013.01); *F23J 15/04* (2013.01); *B01D 2257/504* (2013.01); *B01D 2258/0283* (2013.01); *B01D 2259/65* (2013.01); *C02F 2103/18* (2013.01); *F23J 2215/40* (2013.01); *F23J 2219/40* (2013.01); *Y02A 50/2342* (2018.01); *Y02C 10/06* (2013.01); *Y02E 20/326* (2013.01)

(58) Field of Classification Search
CPC ....... B01D 53/18; B01D 61/025; C02F 1/441; C02F 2103/18; F23J 15/04; F23J 2215/40; F23J 2219/40; Y02A 50/2342; Y02C 10/06; Y02E 20/326
See application file for complete search history.

(56) References Cited

U.S. PATENT DOCUMENTS

| | | |
|---|---|---|
| 2012/0055385 A1 | 3/2012 | Lien et al. |
| 2012/0060689 A1 | 3/2012 | Naumovitz et al. |
| 2012/0061300 A1* | 3/2012 | Matsushiro .......... B01D 61/022 210/137 |
| 2012/0111009 A1 | 5/2012 | Brannon et al. |
| 2012/0318141 A1 | 12/2012 | Tsujiuchi et al. |
| 2013/0327025 A1 | 12/2013 | Shimamura et al. |
| 2014/0123620 A1* | 5/2014 | Huntington ............. F01D 15/12 60/39.52 |
| 2014/0332470 A1* | 11/2014 | Zhang ................... C07F 9/3817 210/697 |
| 2014/0369913 A1* | 12/2014 | Nakamura ............. B01D 53/62 423/220 |

FOREIGN PATENT DOCUMENTS

| | | |
|---|---|---|
| EP | 2335802 A2 | 6/2011 |
| FR | 2996145 A1 | 4/2014 |

OTHER PUBLICATIONS

International Search Report dated Aug. 31, 2015, for PCT application No. PCT/EP2015/056239.

CN search report dated Sep. 7, 2018, for corresponding CN patent application No. 201580018507.2.

* cited by examiner

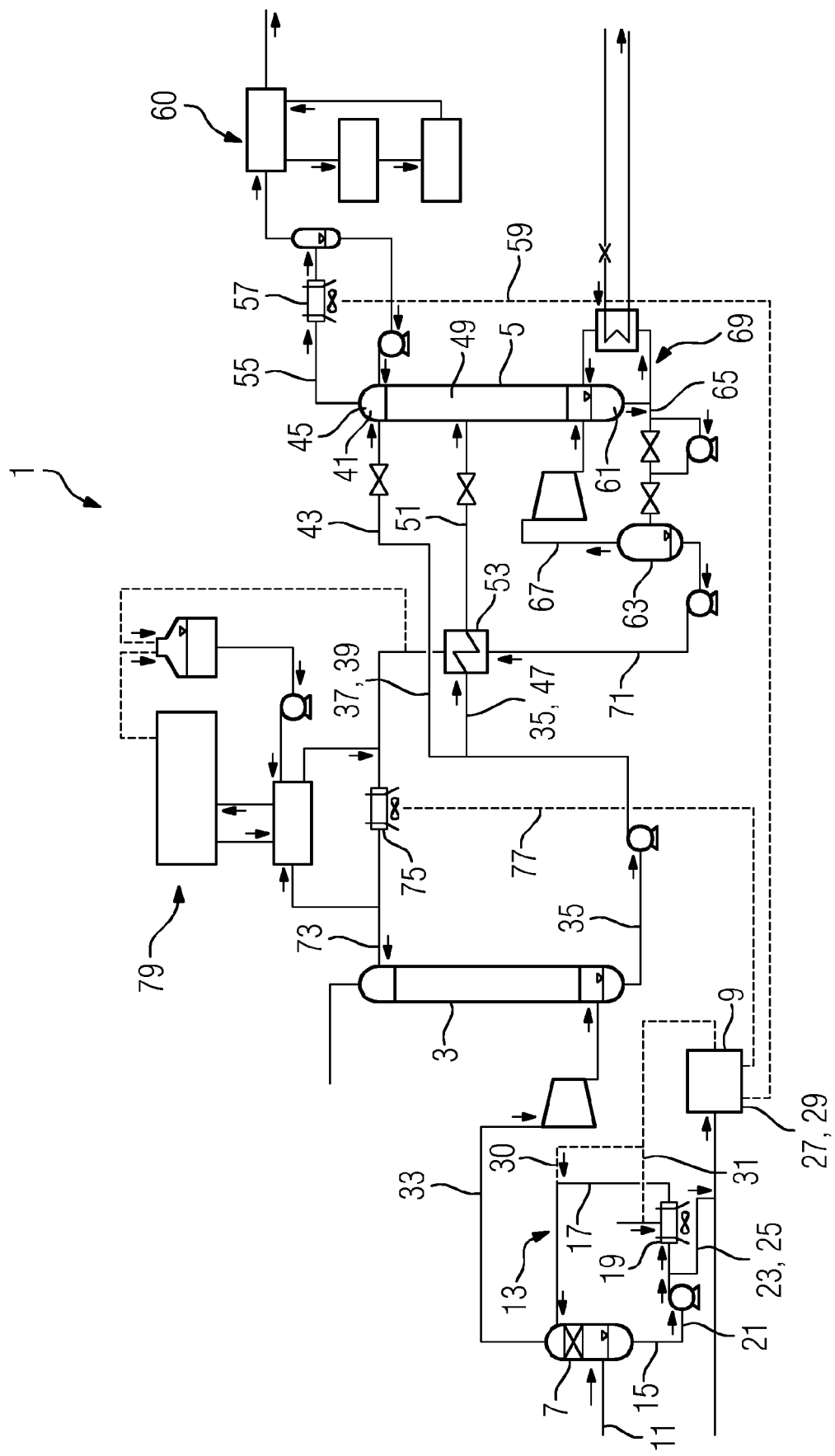

1

DEVICE AND METHOD FOR SEPARATING CARBON DIOXIDE FROM A GAS STREAM, IN PARTICULAR FROM A FLUE GAS STREAM, COMPRISING A COOLING WATER SYSTEM

CROSS REFERENCE TO RELATED APPLICATIONS

This application is the US National Stage of International Application No. PCT/EP2015/056239 filed Mar. 24, 2015, and claims the benefit thereof. The International Application claims the benefit of German Application No. DE 102014206630.1 filed Apr. 7, 2014. All of the applications are incorporated by reference herein in their entirety.

FIELD OF INVENTION

The invention relates to a removal apparatus for carbon dioxide from a gas stream, in particular from a flue gas stream. Furthermore, the invention relates to a process for removing carbon dioxide from a gas stream, in particular from a flue gas stream.

BACKGROUND OF INVENTION

In view of climatic changes, it is a global objective to reduce the emission of pollutants into the atmosphere. This applies particularly to the emission of carbon dioxide ($CO_2$) which accumulates in the atmosphere, hinders radiation of heat from the earth and thus leads, as greenhouse effect, to an increase in the surface temperature of the earth.

Particularly in the case of fossil fuel-fired power stations for generating electric energy or heat, a carbon dioxide-containing gas or flue gas is formed by combustion of a fossil fuel. To avoid or reduce carbon dioxide emissions into the atmosphere, the carbon dioxide has to be separated from the flue gas. Accordingly, suitable measures for separating the carbon dioxide formed after combustion from the flue gas (post-combustion capture) have been discussed, particularly in the case of existing fossil fuel-fired power stations.

For industrial implementation, the carbon dioxide present in the flue gas is for this purpose scrubbed out of the respective flue gas in a removal apparatus by means of an absorption-desorption process using a suitable scrubbing medium or absorption medium. In such a process, cooling of the apparatus components used in the removal apparatus or of the corresponding fluid streams is necessary. Thus, for example, it is necessary to cool the gas stream before entry into the absorber of the removal apparatus, to cool the scrubbing medium used for absorption of carbon dioxide and likewise to cool the carbon dioxide-rich gas outlet stream at the top of the desorber.

Liquid-cooled cooling units and in particular water-cooled cooling units are frequently used for this purpose. However, water cooling is problematical at, in particular, sites where no water or only small amounts of water is/are available. The use of water-cooled cooling units is not economical here since bringing water to the desired sites is associated with great complication and, resulting therefrom, with correspondingly high costs.

SUMMARY OF INVENTION

A first object of the invention is to provide a very inexpensive possibility which is very simple to implement in process and apparatus terms for cooling the apparatus components used in a removal apparatus for carbon dioxide.

A second object of the invention is to provide a process for removing carbon dioxide, in which the required cooling of the fluid streams is very inexpensive and efficient.

The first object of the invention is achieved according to the invention by a removal apparatus for carbon dioxide from a gas stream, in particular from a flue gas stream, which comprises an absorber for separating carbon dioxide from the gas stream by means of a scrubbing medium, a desorber which is connected hydrodynamically to the absorber for liberating the absorbed carbon dioxide from the scrubbing medium, a gas cooler which is located hydrodynamically upstream of the absorber for cooling the gas stream, and also a treatment unit which is located downstream of the gas cooler and is equipped and configured for purifying water from the gas cooler.

In a first step, the invention proceeds from the fact that at sites without access to water, recourse is usually made to air-cooled cooling units instead of the customary water-cooled cooling units. However, in such air coolers, large cooling areas and high-performance blowers are necessary because of the high gas-side heat transfer resistance, so that air coolers have a correspondingly large space requirement and cause high noise emissions and also high capital and operating costs. However, the above-described disadvantages are accepted because of the lack of alternatives.

In a second step, the invention takes account of the fact that water, inter alia, is present as combustion product in the flue gas of fossil fuel-fired power stations, because of the hydrogen-containing compounds present in the fuel. Since the flue gas has to be cooled before entering into a removal apparatus or the corresponding absorber, water present in the flue gas condenses in a gas cooler located upstream of the absorber. In order to keep the amount of coolant used for cooling the flue gas constant despite the condensate formed, a corresponding substream has to be taken from the gas cooler during operation. This substream is usually discarded unutilized as wastewater.

Taking into account what has been said above, the invention surprisingly recognizes, in a third step, that the substream taken from the gas cooler can be utilized in a targeted manner as cooling water instead of being discarded. This can be achieved by means of a treatment unit located downstream of the gas cooler, by means of which excess water from the gas cooler can be purified in a targeted manner.

A substream of water taken from the gas cooler can be fed to the treatment unit, purified in this and subsequently utilized for cooling apparatus components and/or liquid streams in the framework of a removal process for carbon dioxide. As an alternative, the water which has been purified in the treatment unit can be stored with a view to later use. In other words, the offtake and subsequent purification of previously discarded wastewater enables cooling water to be generated on site and this to be utilized in a targeted manner.

In particular, the purified water can be used for corrosion-free spray cooling of air coolers which are already in use. Here, the purified water vaporizes virtually without leaving a residue. Withdrawal of the enthalpy of vaporization leads to the air stream being cooled and the heat transfer being improved. As a result, an air cooler can firstly be made smaller and secondly lower temperatures can be achieved on the process side.

Overall, the targeted recovery, purification and possible storage of the offgas component water and its subsequent utilization contributes to more efficient cooling of the removal process for carbon dioxide from gas streams. For this reason, not only a saving in capital and operating costs but at the same time also a reduction in the required construction area and noise emissions can be realized for the air coolers used. In addition, targeted generation of cooling water on site allows the use of water-cooled cooling units even at sites without direct access to water.

The treatment unit located downstream of the gas cooler can, for example, be hydrodynamically connected to the latter on the condensate side, so that the water to be purified can be conveyed directly from the cooler to the treatment unit. As an alternative, the use of a treatment unit which is not directly connected and to which the water to be purified firstly has to be transported and appropriately purified there is also possible.

As gas cooler, preference is given to using a conventional flue gas cooler. Purification of the water taken from the gas cooler and the possibility of a subsequent, either indirect or direct, further use likewise makes it possible to use water-cooled cooling units which were hitherto impossible or possible to only a limited extent in the case of lack of water at the sites of the respective removal apparatus.

In an advantageous embodiment of the invention, the treatment unit is hydrodynamically connected via a feed line to the condensate side of the gas cooler. The feed line can be connected directly to the gas cooler and makes it possible for at least a substream of the water obtained in the gas cooler to be fed to the treatment unit. The offtake of the water obtained from the gas cooler is advantageously carried out continuously in order to keep the amount of water required for cooling the gas stream within the gas cooler constant during operation. The water obtained as condensate from the flue gas mixes with the water used for cooling the gas stream in a typical flue gas cooler. The amount of water taken off here is, in particular, dependent on the amount of water condensed out of the gas stream or the flue gas by cooling. In other words, the amount of water taken off is essentially proportional to the amount of water condensed out of the flue gas.

In a variant, the gas cooler is installed in a coolant circuit which is hydrodynamically connected via the feed line to the treatment unit. The coolant circuit advantageously comprises a warm water line, a cold water line and a cooling unit arranged between the two lines. The feed line is advantageously connected to the warm water line of the coolant circuit. The cooling water which has been heated in the gas cooler is discharged from the gas cooler via the warm water line, in particular together with the condensate.

A substream of the water flowing out of the gas cooler is fed via the feed line to the treatment unit and appropriately purified there. The remaining water, the main stream, is fed to the cooling unit, cooled there and conveyed via the cold water line back to the gas cooler for renewed cooling of an inflowing gas stream.

In order to make the desired purification of the wastewater fed to the treatment unit possible, the treatment unit advantageously comprises a reverse osmosis plant. Here, the wastewater is pushed through a synthetic semipermeable membrane which allows the water but not the impurities present therein to pass through. The purified water collects on the one side of the membrane and can then be conveyed to a use and/or storage. The impurities which have been separated off on the other side of the membrane can be discarded as waste stream.

The water which has been purified in the treatment unit, in particular by means of the reverse osmosis plant, can subsequently be conveyed to a temporary storage and be utilized when required. For this purpose, the treatment unit comprises a stock tank in an advantageous embodiment. The stock tank can, for example, be hydrodynamically connected to the reverse osmosis plant. As an alternative, it is possible to use a separate stock tank to which the purified water is transported from the treatment unit.

Storage or stocking of the purified water is particularly advantageous when the cooling units used in a removal apparatus are configured as air coolers. Here, the purified water can be stored particularly when exterior temperatures are low and as a function of the time of year and/or day and the removal apparatus can be operated using pure air cooling. At higher exterior temperatures when pure air cooling is no longer sufficient, the stored water can be used for a spray cooling process of the air coolers. The water stored in the stock tank can fundamentally be used for cooling for all cooling units used in the removal apparatus.

As an alternative to or in addition to temporary storage of the purified water within a stock tank, the direct use of the water after it has been purified in the treatment unit is also possible.

In an advantageous embodiment, the treatment unit is configured for discharge of purified water to the gas cooler. Here, a discharge line connected to the treatment unit is advantageously connected to the gas cooler. The water which has been purified in the treatment unit can thus be fed as coolant directly to the gas cooler and there be utilized for cooling the flue gas and the further condensation of water associated therewith.

In a further advantageous embodiment, the treatment unit is configured for discharge of purified water to the coolant circuit of the gas cooler. For this purpose, the treatment unit advantageously comprises a discharge line connected to the coolant circuit. The purified water can, as an alternative, also be fed to a cooling unit installed in the coolant circuit and utilized there in the heat exchanger for cooling the cooling water which has been taken from the gas cooler and has been heated by cooling of the flue gas.

A direct contact cooler is advantageously used as gas cooler. In a direct contact cooler, the mixture to be cooled, in the present case a gas stream or a flue gas stream, is conveyed in direct heat exchange through a coolant such as cold water an cooled thereby. A direct contact cooler usually has internals in the form of mass transfer elements such as sieve trays, random packing elements or ordered packings.

In order to separate off the carbon dioxide present in the flue gas, the flue gas which has been cooled in the gas cooler is fed to the absorber of the removal apparatus. As a result of contact with scrubbing medium present in the absorber, the carbon dioxide present in the flue gas is absorbed. The scrubbing medium loaded with carbon dioxide then flows into the desorber where the carbon dioxide is liberated from the scrubbing medium by thermal desorption. For this purpose, the absorber is advantageously hydrodynamically connected via a discharge line to a feed line of the desorber. The scrubbing medium which has been regenerated in the desorber is subsequently fed back into the absorber for renewed absorption of carbon dioxide from the flue gas, for which purpose a discharge line of the desorber is connected to a feed line of the absorber.

Since the scrubbing medium conveyed from the desorber to the absorber has to be cooled to the low temperature required for absorption of the carbon dioxide before entry into the absorber, it is also advantageous for a cooling unit hydrodynamically connected to the treatment unit for cooling the scrubbing medium fed to the absorber to be installed in the feed line of the absorber. For this purpose, the treatment unit advantageously comprises a discharge line which is hydrodynamically connected to the cooling unit. The cooling unit serves to cool the regenerated scrubbing medium leaving the desorber before entry into the desorber. The hydrodynamic connection of a discharge line of the treatment unit to the cooling unit enables the water which has been purified in the treatment unit to be used for this purpose.

The carbon dioxide-rich gas outlet stream taken from the desorber also has to be cooled before further use or possible storage. In a further advantageous embodiment of the invention, the desorber comprises a discharge line for a gas outlet stream in which a cooling unit hydrodynamically connected to the treatment unit is installed. Here, it is advantageous for the treatment unit to comprise a discharge line which is connected to the cooling unit. The gas outlet stream at the top of the desorber comprises mostly the carbon dioxide which has been liberated from the scrubbing medium. Here too, the water which has been purified in the treatment unit can be used for cooling as a result of the hydrodynamic connection of a discharge line of the treatment unit to the discharge line.

Overall, the purified excess water can be utilized for cooling all cooling units used within the removal apparatus. The cooling units, in particular those in the feed line of the absorber, in the discharge line of the desorber and in the coolant circuit of the gas cooler, can either be air-cooled or water-cooled. Regardless of the type of cooling unit, the purified water can either be conveyed from the treatment unit to the cooling unit or be stored beforehand in the stock tank until the point in time of the desired use.

Optional cooling of individual process steps or individual apparatus components is equally possible in this case, as is joint cooling of a plurality of or all above-described processes and/or apparatus components.

Furthermore, it is advantageous for a pressure vessel for feeding scrubbing medium which has been freed of carbon dioxide in the desorber to be connected to the desorber via a discharge line. The pressure vessel is advantageously configured for lean solvent flash. Here, the pressure is reduced within the pressure vessel so that the inflowing scrubbing medium is depressurized and part of it vaporizes to form a gas phase and a liquid phase.

The pressure vessel is advantageously hydrodynamically connected to the desorber via a discharge line configured as vapor line. The gaseous scrubbing medium arising in the pressure vessel is fed as a first substream to the desorber via the discharge line. As a result of the subsequent condensation of the vaporous scrubbing medium within the desorber, heat required for desorption of the carbon dioxide from the scrubbing medium can be recovered.

A further discharge line of the pressure vessel is also advantageously connected to a feed line of the absorber. In this way, the liquid scrubbing medium can be recirculated as a second substream from the pressure vessel to the absorber. As a result of the gas phase being separated off beforehand as first substream, the scrubbing medium is virtually completely freed of absorbed carbon dioxide after passage through the pressure vessel.

In a further embodiment, a branch line for taking off a first substream of the loaded scrubbing medium is connected to the discharge line of the absorber and is hydrodynamically connected to a feed line of the desorber. In this way, the scrubbing medium taken from the absorber can be divided into at least two substreams. This process is known as split feed process.

A reboiler is advantageously connected to the desorber. The reboiler acts as a bottom vaporizer and supplies the necessary regeneration heat for separation of absorbed $CO_2$ from the scrubbing medium. The loaded scrubbing medium is in this case regenerated by means of vapor produced in the reboiler. To generate the vapor within the reboiler, this is usually heated by means of imported steam, for example from an associated steam power station.

An amino acid salt solution is advantageously used as absorption medium. An aqueous amino acid salt solution is advantageous here. Amino acid salts are suitable particularly because of their barely perceptible vapor pressure which prevents discharge into the atmosphere. One advantageous amino acid salt is a salt of a metal, in particular of an alkali metal. It is also possible to use mixtures of various amino acid salts as active component of the absorption medium.

The second object of the invention is achieved according to the invention by a process for removing carbon dioxide from a gas stream, in particular from a flue gas stream, wherein a gas stream is fed to a gas cooler, wherein the gas stream is cooled within the gas cooler with condensation of water, wherein water is taken from the gas cooler, wherein at least a substream of the water taken from the gas cooler is fed to a treatment unit in which the water is purified for a further use, and wherein the cooled gas stream is fed to an absorber of a removal apparatus in which carbon dioxide present in the gas stream is separated from the gas stream by means of a scrubbing medium.

Such a process allows wastewater from a gas cooler used for cooling gas streams, which has hitherto been discarded unutilized, to be purified and subsequently used in a targeted manner for efficient cooling of fluid streams and/or apparatus components used in the removal process for carbon dioxide.

The gas cooler used is advantageously operated using water as coolant. Due to the water which has additionally been condensed out of the flue gas stream, an excess of water arises. The excess water is separated off from the water required for cooling and fed to a treatment unit. In this treatment unit, the water is purified, which allows its use as cooling water in the removal process.

Here, the purified water, which can be stored before use if required, is advantageously utilized for spray cooling of cooling units used as air coolers. It is likewise basically possible to utilize the purified water in water-cooled cooling units.

Further advantageous variants of the process can be derived from the dependent claims directed to the process.

The advantages described for the removal apparatus and its advantageous further developments can be applied analogously to the process and its further developments.

BRIEF DESCRIPTION OF THE DRAWINGS

A working example of the invention is described in more detail below with the aid of a drawing.

DETAILED DESCRIPTION OF INVENTION

The sole FIGURE shows a removal apparatus 1 for carbon dioxide from a flue gas stream. The removal apparatus 1 comprises an absorber 3 and a desorber 5 which is hydrodynamically connected to the absorber 3. A gas cooler 7 configured as flue gas cooler, to which a treatment unit 9 for water is assigned, is located hydrodynamically upstream of the absorber 3.

In order to purify flue gas, which is obtained, for example, as combustion offgas in the combustion of fossil fuels in power stations, and in particular to separate the carbon dioxide present in the flue gas from the flue gas, a flue gas stream is firstly fed via a flue gas line 11 to the removal apparatus 1. The flue gas flows via the flue gas line 11 into the flue gas cooler 7 which is configured as a direct contact cooler and is operated using water as coolant. The flue gas is cooled in the flue gas cooler 7 before it is fed to the absorber 3 of the removal apparatus 1.

The flue gas cooler 7 itself is installed in a coolant circuit 13 which comprises a warm water line 15, a cold water line 17 and a cooling unit 19 which is configured as air cooler and is installed between the two lines 15, 17. The water which has been heated during cooling of the flue gas is discharged from the flue gas cooler 7 via the warm water line 15, cooled in the cooling unit 19 and fed via the cold water line 17 back to the flue gas cooler 7 for renewed cooling of the flue gas stream.

Since not only carbon dioxide but also water is present as combustion product in the flue gas, this water condenses out during cooling of the flue gas in the flue gas cooler 7 and mixes with the cooling water stream. In order to keep the amount of water required for cooling of the flue gas constant within the coolant circuit 13, excess water is therefore in the present case continuously taken off in the flue gas cooler 7 from the water stream 21 leaving the gas cooler 7 via the warm water line 15, for which purpose a substream 23 is taken off.

Instead of discarding the excess part of the water as has hitherto been usual, the substream 23 of the water from the flue gas cooler 7 is fed via a feed line 25 to the treatment unit 9. In the treatment unit 9, the water which has been taken off is purified by means of reverse osmosis in a corresponding reverse osmosis plant 27. The purified water is then stored in a stock tank 29, which is part of the treatment unit 9.

The water stored in the stock tank 29 can then be used as required for cooling apparatus components and/or fluid streams used in the removal apparatus 1. In the present case, the water from the stock tank 29 is used, in particular, for cooling the air cooler 19 in the coolant circuit 13 in the form of spray cooling, which is indicated by the broken line 31. In other words, the stock tank 29 and the treatment unit 9 are connected to the air cooler 19 in order to introduce water for the purpose of cooling. As an alternative, the water can also be transported in another way from the stock tank 29 to the air cooler 19. The treatment unit 9 can also be configured for discharging the purified water to the coolant circuit 13 and/or to the gas cooler 7. This is depicted in FIG. 1 by a corresponding discharge line 30.

In order to ensure the desired separation of carbon dioxide from the flue gas, the flue gas which has been cooled in the flue gas cooler 7 flows via a feed line 33 into the absorber 3 of the removal apparatus 1. Here, it is brought into contact with a scrubbing medium, namely a potassium-containing amino acid salt, in which the carbon dioxide present in the flue gas is absorbed. The scrubbing medium loaded with carbon dioxide is conveyed from the absorber 3 to the desorber 5. For this purpose, the loaded scrubbing medium is taken off from the absorber 3 via the discharge line 35.

A first substream 37 is fed via a branch line 39 connected to the discharge line 35 of the absorber 3 into a first desorber stage 41 of the desorber 5 located downstream of the absorber 3, for which purpose the branch line 39 is hydrodynamically connected to a feed line 43 of the desorber 5. The first substream 37 is fed into the first desorber stage 41 without preheating at the top 45 of the desorber 5.

A second substream 47 is fed to a second desorber stage 49 of the desorber 5 via a hydrodynamic connection of the discharge line 35 to a further feed line 51 of the desorber 5. Here, the second substream 47 firstly passes through the heat exchanger 53 and is preheated by the regenerated scrubbing medium recirculated from the desorber 5.

In the desorber 5, the carbon dioxide absorbed in the scrubbing medium is liberated and taken off via a discharge line 55 at the top 45 of the desorber 5. A further cooling unit 57 configured as an air cooler which serves to cool the gas outlet stream is installed in the discharge line 55. This air cooler 57 is likewise cooled by means of water which has been purified in the treatment unit 9. The amount of water required for this purpose is taken from the stock tank 29 and utilized for spray cooling the air cooler 55. Here too, this utilization is indicated by a broken line 59. The broken line 59 can, in particular, be a connecting conduit for water or a transport connection for water. The cooled gas outlet stream is finally conveyed, for example, to an appropriate utilization facility 60, for example for storage and/or possible further utilization of the carbon dioxide.

The scrubbing medium which has been freed of carbon dioxide collects at the bottom 61 of the desorber 5 and is fed to a pressure vessel 63 configured as lean solvent flash process. For this purpose, the desorber 5 is connected via a discharge line 65 to the pressure vessel 63. In the pressure vessel 63, the scrubbing medium is depressurized to form a gas phase and a liquid phase. The gas is fed via a discharge line 67 of the pressure vessel 63 to the desorber 5. Heat required for desorption of the carbon dioxide from the scrubbing medium can be recovered by subsequent condensation of the vaporous scrubbing medium in the desorber 5.

In addition, a reboiler 69 is connected to the desorber 5 and, as bottom vaporizer, likewise supplies part of the regeneration heat for liberation of the carbon dioxide absorbed in the scrubbing medium.

The liquid phase of the scrubbing medium is recirculated from the pressure vessel 63 to the absorber 3, for which purpose a discharge line 71 of the pressure vessel 63 is connected to a feed line 73 of the absorber 3. During this recirculation, the regenerated scrubbing medium likewise passes through the heat exchanger 53 and is cooled here by transfer of heat to the loaded scrubbing medium from the absorber 3.

To ensure that the scrubbing medium has the low temperatures required for the absorption of carbon dioxide from the flue gas before entering into the absorber 3, a further cooling unit 75, by means of which the scrubbing medium is cooled further before entry into the absorber 5, is installed in the feed line 73 to the absorber 3. This cooling unit 75, too, is configured as an air cooler and is cooled by spray cooling using water taken from the stock tank 29, which is indicated by the broken line 77.

The broken line 77 can, in particular, be a connecting conduit for water or a transport connection.

In addition, there is a reclaiming apparatus 79 which, for further treatment of the scrubbing medium, in particular by removal of nitrogen oxides ($NO_x$) and sulfur oxides ($SO_x$), takes off part of the scrubbing medium from the feed line 73 and treats it appropriately. The scrubbing medium is then fed, after purification and treatment, to the absorber 3 and can there again be used for absorption of carbon dioxide from a flue gas.

The cooling of the cooling units 19, 57, 75 by means of water from the stock tank 29 is essentially optional. It is thus possible to cool one, more than one or, as described here, all cooling units 19, 57, 75 by means of the water stored in the stock tank 29. Furthermore, it is likewise possible to use water-cooled cooling units instead of the air coolers 19, 57, 75. In the case of water-cooled cooling units, it is possible to use, for example, heat exchangers which use the water which has been purified in the treatment unit 9 as coolant in an appropriate coolant circuit. The cooling units can be connected directly via a water line to the treatment unit 9. The treated water can, as an alternative, also be transported as freight to the cooling units.

The invention claimed is:

1. A removal apparatus for carbon dioxide from a gas stream, comprising:
   an absorber configured to separate carbon dioxide from the gas stream by means of a scrubbing medium,
   a desorber which is connected hydrodynamically to the absorber and configured to liberate absorbed carbon dioxide from the scrubbing medium, wherein a discharge line from the desorber is connected hydrodynamically to a feed line of the absorber,
   a gas cooler which is located hydrodynamically upstream of the absorber, which is configured to cool the gas stream, and which is configured to produce a stream of water,
   a spray cooling unit configured to use a spray cooling medium to spray cool a first portion of the stream of water discharged from the gas cooler;
   a treatment unit which is located downstream of the gas cooler and is configured for purifying a second portion of the stream of water discharged from the gas cooler,
   a connection configured to deliver purified water from the treatment unit to the spray cooling unit where the purified water is used as the spray cooling medium, and
   an absorber spray cooling unit configured to use a respective spray cooling medium to spray cool the scrubbing medium fed to the absorber, wherein the absorber spray cooling unit is connected hydrodynamically to the treatment unit, which absorber spray cooling unit is installed in the feed line of the absorber, and wherein the purified water from the treatment unit is used as the respective spray cooling medium in the absorber spray cooling unit.

2. The removal apparatus as claimed in claim 1, wherein the treatment unit comprises a reverse osmosis plant.

3. The removal apparatus as claimed in claim 1, wherein the treatment unit comprises a stock tank.

4. The removal apparatus as claimed in claim 1, wherein the treatment unit is configured for feeding purified water to the gas cooler.

5. The removal apparatus as claimed in claim 1, wherein a direct contact cooler is used as the gas cooler.

6. The removal apparatus as claimed in claim 1, wherein the absorber is connected hydrodynamically via a discharge line to a feed line of the desorber.

7. The removal apparatus as claimed in claim 1, wherein the desorber comprises a discharge line for a gas outlet stream in which a desorber spray cooling unit connected hydrodynamically to the treatment unit is installed, wherein the desorber spray cooling unit is configured to use a respective spray cooling medium to spray cool the gas outlet stream, and wherein the purified water from the treatment unit is used as the respective spray cooling medium in the desorber spray cooling unit.

8. The removal apparatus as claimed in claim 1, wherein the treatment unit is connected hydrodynamically via a feed line to the gas cooler.

9. The removal apparatus as claimed in claim 8, wherein the gas cooler is installed in a coolant circuit which is connected hydrodynamically via the feed line to the treatment unit.

10. The removal apparatus as claimed in claim 9, wherein the treatment unit is configured for feeding purified water to the coolant circuit of the gas cooler.

11. A process for removing carbon dioxide from a gas stream, the process comprising:
    feeding a gas stream to a gas cooler,
    cooling the gas stream within the gas cooler and condensing water out of the gas stream,
    taking water from the gas cooler, wherein at least a substream of the water from the gas cooler is fed to a treatment unit in which the water is purified for a further use in the process,
    spray cooling a second substream of the water from the gas cooler in a spray cooling unit configured to use water purified in the treatment unit as a spray cooling medium,
    returning water than has been spray cooled to the gas cooler, and
    feeding the cooled gas stream to an absorber of a removal apparatus in which carbon dioxide present in the gas stream is separated from the gas stream by means of a scrubbing medium,
    wherein the scrubbing medium loaded with carbon dioxide from the absorber is fed to a desorber of the removal apparatus in which the absorbed carbon dioxide is liberated from the scrubbing medium, and
    wherein the scrubbing medium loaded with carbon dioxide is fed into the desorber from the absorber without being preheated.

12. The process as claimed in claim 11, wherein the substream is taken from a coolant circuit of the gas cooler.

13. The process as claimed in claim 12, wherein the water which has been purified in the treatment unit is fed to the coolant circuit.

14. The process as claimed in claim 11, wherein the purification of the water in the treatment unit is effected by means of reverse osmosis.

15. The process as claimed in claim 11, wherein the water which has been purified in the treatment unit is fed to the gas cooler.

16. The process as claimed in claim 11, wherein a direct contact cooler is used as the gas cooler.

17. The process as claimed in claim 11, spray cooling scrubbing medium fed to the absorber in an absorber spray cooling unit configured to use water purified in the treatment unit as a respective spray cooling medium.

18. The process as claimed in claim 11, spray cooling carbon dioxide liberated in the desorber in a desorber spray cooling unit configured to use water purified in the treatment unit as a respective spray cooling medium.

19. A removal apparatus for carbon dioxide from a gas stream, comprising:
    an absorber configured to separate carbon dioxide from the gas stream by means of a scrubbing medium,
    a desorber which is connected hydrodynamically to the absorber and configured to liberate absorbed carbon dioxide from the scrubbing medium,
    a gas cooler which is located hydrodynamically upstream of the absorber , which is configured to cool the gas stream, and which is configured to produce a stream of water, a spray cooling unit configured to use a spray cooling medium to spray cool a first portion of the stream of water discharged from the gas cooler;

a treatment unit which is located downstream of the gas cooler and is configured for purifying a second portion of the stream of water discharged from the gas cooler, and a connection configured to deliver purified water from the treatment unit to the spray cooling unit where the purified water is used as the spray cooling medium, wherein the scrubbing medium is fed into the desorber from the absorber without being preheated.

* * * * *